J. H. VAN VIERSEN.
PROCESS FOR JOINING UP ELECTRIC AND OTHER WIRES.
APPLICATION FILED SEPT. 11, 1917.

1,297,614. Patented Mar. 18, 1919.

J. H. van Viersen,
Inventor

By _____
Attorney.

UNITED STATES PATENT OFFICE.

JACOB HENDRIK van VIERSEN, OF THE HAGUE, NETHERLANDS.

PROCESS FOR JOINING UP ELECTRIC AND OTHER WIRES.

1,297,614.      Specification of Letters Patent.      Patented Mar. 18, 1919.

Application filed September 11, 1917. Serial No. 190,821.

*To all whom it may concern:*

Be it known that I, JACOB HENDRIK VAN VIERSEN, electrician, a subject of the Queen of the Netherlands, residing at the Hague, the Netherlands, have invented certain new and useful Improvements in Processes for Joining Up Electric and other Wires, of which the following is a specification.

The present invention relates to improvements in a process and means for joining electric and other wires.

Heretofore junctions in electric lines for connecting or branching off same by means of so-called junction boxes are generally obtained as follows:

The ends of the wires are stripped over a certain length of their insulation, twisted together with a pair of tongs and connected by means of a soldering lamp and a rod of tin solder after which the junction is covered by or wound with an insulating material. This method of proceeding answers moderate requirements but possesses the drawbacks that it requires a great deal of dexterity from the workman for producing a correct junction and that even then it lends to an important waste of solder, the hardly avoidable singe of the wire insulation and the gradual destruction of the latter by the soldering liquid or grease.

The object of the present invention is to provide a process for making such junctions whereby the different drawbacks mentioned above are wholly avoided and which possesses moreover the advantage of effecting an important saving of time.

The invention is explained by the accompanying drawing which represents a three wire junction in longitudinal section and in different phases of the process. In the drawing:—

Figure 1:
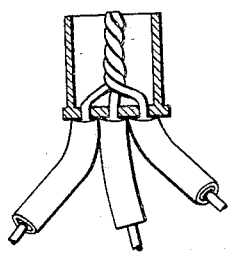
Figure 1 shows stripped wire ends introduced into an inner tube and twisted together; a tube cap filled with paste being shown above it.
Figure 2:
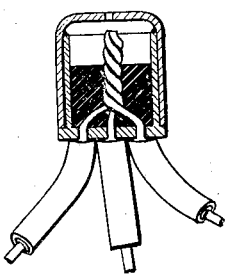
Fig. 2 shows the tube cap passed over the inner tube and the paste delivered to the latter.
Figure 3:
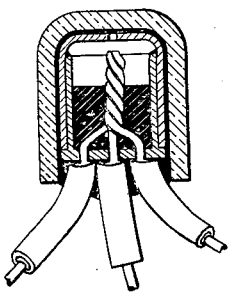
Fig. 3 shows the completed junction with an insulating cap passed over it and fixed by means of a hardening material which is sticky in hot condition.

According to the invention the junction is obtained by means of a small metal junction tube closed at one end and being provided with holes the number and diameter of which correspond with those of the wires to be connected. In use the wire ends are stripped of their insulation and passed through these holes and twisted together within the tube by means of a pair of tongs, the superfluous ends being at the same time cut off. A fitting cover closed at one end is then passed over the tube this cover being filled with soldering paste which is consequently delivered to the tube. The totally closed tube is then heated, preferably by a soldering iron especially adapted for this purpose and which is described in the specification of a concurrent application, until the solder flows, which fact may be observed through a narrow opening formed in the tube cover. The junction itself is then completed and may be insulated in any ordinary manner. The insulation described in the following is, however, the preferred one.

The solder having been in a flowing condition, the tube is covered, while still being hot, with a sticky insulation material, for example with the material generally used and known as Chatterton compound; the whole is covered with an insulation cap of fiber, porcelain, or the like. It is clear that this insulation cap is not necessary for realizing the process but its application constitutes a very useful extension of same. The application of the metal tube cap is neither strictly necessary for obtaining the advantages of the process. The soldering paste may also be introduced into the tube in another manner and then made to flow. Wasting solder and damaging the wire insulation are even then equally well avoided.

Having now particularly described and ascertained the nature of my said invention and in what manner the same is to be performed, I declare that what I claim is:

1. A process for joining up wires which consists in passing the wire ends through holes provided in the bottom of a metal junction tube (twisting the wires together to secure them in the tube) and soldering said wire ends, substantially as described.

2. A process for joining up wires, which consists in passing the wire ends through holes provided in the bottom of a metal junction tube (twisting the wires together to secure them in the tube), soldering the wires and insulating the whole in an efficient manner, substantially as described.

3. A process for joining up wires, which consists in passing the wire ends through holes provided in the bottom of a metal junction tube, twisting them together, cutting them to length, soldering them by means of soldering paste and insulating the whole in an efficient manner, substantially as described.

4. A process for joining up wires by means of a junction tube provided with holes in its bottom through which the wire ends are passed, whereby the soldering paste is introduced into the junction tube by means of a tube cap closed at one end and fitting on the junction tube, said cap being soldered together with the wires and the tubes, substantially as described.

5. A process for joining up wires, which consists in passing the wire ends through holes provided in the bottom of a metal junction tube, twisting said wire ends together, cutting them to length, soldering them with a soldering paste introduced into the junction tube by means of a metal tube cap fitting on the tube and passing an insulation cap over the junction tube and the cap, substantially as described.

6. A process for joining up wires, which consists in passing the wire ends through holes provided in the bottom of a metal junction tube, twisting said wire ends together, cutting them to length, soldering them with a soldering paste introduced into the junction tube by means of a metal tube cap fitting on the tube, covering the whole while still being hot with a thin layer of a hardening material which is sticky in hot condition and passing an insulation cap over the junction tube and cap, substantially as described.

7. A process for joining up metal wires, which consists in passing the wire ends through holes provided in the bottom of a metal junction tube, twisting said wire ends together to secure them in the tube, cutting them to length and soldering them with a soldering paste contained in the junction tube and brought to a flowing condition.

8. A process for joining wires which consists in passing the wire ends through holes provided in the bottom of a metal junction tube open at one end, introducing soldering material into said tube, and melting the soldering material by heating the tube.

9. A process for joining wires which consists in passing the wire ends through holes provided in the bottom of a metal junction tube having an open end, placing a tube cap containing soldering material over the open end of the junction tube, and applying heat to the tubes to melt the solder and unite the wires, tube and cap.

10. A process for joining wires which consists in passing the wire ends through holes provided in the bottom of a metal junction tube, introducing soldering material into this tube and melting it by heating the tube, covering the whole while still hot with a thin layer of hardening material which is sticky in hot condition, and passing an insulating cap over the junction tube.

In testimony whereof I affix my signature in presence of one witness.

JACOB HENDRIK van VIERSEN.

Witness:
PLANTE FÉBRUE.